United States Patent [19]

Chandross et al.

[11] Patent Number: 5,379,364
[45] Date of Patent: Jan. 3, 1995

[54] VITREOUS SILICA PRODUCT MANUFACTURED VIA A SOL-GEL PROCESS USING A POLYMER ADDITIVE

[75] Inventors: Edwin A. Chandross, Murray Hill; Debra A. Fleming, Lake Hiawatha; David W. Johnson, Jr., Bedminster; John B. MacChesney, Lebanon; Frederick W. Walz, Jr., Plainfield, all of N.J.

[73] Assignee: AT&T Corp., Murray Hill, N.J.

[21] Appl. No.: 115,485

[22] Filed: Aug. 31, 1993

Related U.S. Application Data

[62] Division of Ser. No. 930,125, Aug. 14, 1992, Pat. No. 5,240,488.

[51] Int. Cl.⁶ .................... G02B 6/00; C03B 19/06
[52] U.S. Cl. ...................... 385/143; 385/141; 501/95; 65/395
[58] Field of Search ............... 385/141, 143; 65/18.1, 65/18.3, 18.4, 311, 900, 901; 501/12, 95

[56] References Cited

U.S. PATENT DOCUMENTS

| | | | |
|---|---|---|---|
| 4,397,666 | 8/1983 | Mishima et al. | 65/18.3 |
| 4,838,914 | 6/1987 | Ohta et al. | 65/18.3 X |
| 4,860,045 | 7/1987 | Osafune et al. | 65/17 |
| 4,872,895 | 10/1989 | Fleming et al. | 65/18.1 |
| 4,897,370 | 1/1990 | Horiguchi et al. | 501/95 X |
| 5,009,688 | 4/1991 | Nakanishi | 65/18.3 |

OTHER PUBLICATIONS

J. Zarzycki, "The Gel–Glass Process", pp. 203–231, *Glass: Current Issues*, A. F. Wright and J. Dupois, eds., Boston, Mass. (1985).
T. Mori, "Silica Glass Tubes By New Sol–Gel Method", *J. Non–Crystalline, Solids* 100, pp. 523–525 (1988).
Katagiri and Maekawa, *J. Non–Crystalline Solids*, 134, pp. 183–190 (1991).
K. Chou, "Effect of Aging Media on Gel Structure and Monolithicity", *Journal of Mat. Science* 27, pp. 520–526 (1992).
R. Dorn, et al., "Glass from Mechanically Shaped Preforms", *Glastech*, Ber., 60, pp. 79–82 (1987).
P. Bachman, "Preparation of Quartz Tubes by Centrifugal Deposition of Silica Particles", *Proceedings of the 14th European Conference on Optical Communications*, London (1988).
Donald R. Ulhrich, "Sol–Gel Processing", *Chemtch*, pp. 242–249 (1988).
R. G. Horn, *J. Am. Ceram. Soc.*, 73, p. 1117 (1990).
S. Lowell, "Introduction to Powder Surface Area", Wiley, 90–99, pp. 181–189 (1979).
K. Iler, *The Chemistry of Silica*, Chapter 3, John Wiley & Sons, New York (1979).
J. B. MacChesney, "Influence of Dehydration/Sintering Condition on the Distribution of Impurities in Sol--Gel Derived Silica Glass", *Mat. Res. Bull.*, pp. 1209–1221 (1987).
F. V. DiMarcello, "Fiber Drawing and Strength Properties", *Optical Fiber Communications*, ed. T. Li, Academic Press, New York (1985).

*Primary Examiner*—Brian Healy
*Assistant Examiner*—Hemang Sanghavi
*Attorney, Agent, or Firm*—George S. Indig

[57] ABSTRACT

Lowered cost fabrication including preparation of large bodies of void-free, high-silica glass, depends upon gellation of an aqueous sol of colloidal silica particles, followed by drying and firing of such gel. Freedom from cracks in the dried gel is the consequence of included polymeric material which wets the particles. The polymeric material is removed by thermal decomposition attended upon temperature attained in firing.

15 Claims, 2 Drawing Sheets

VITREOUS SILICA PRODUCT MANUFACTURED VIA A SOL-GEL PROCESS USING A POLYMER ADDITIVE

This is a division of application Ser. No. 07/930,125 filed Aug. 14, 1992 now U.S. Pat. No. 5,240,488.

BACKGROUND OF THE INVENTION

1. Technical Field

The invention is concerned with the economical fabrication of a variety of products entailing sol-gel produced high silica glass. In broad terms, the inventive advance is low-cost. Resulting product may have properties equal to those of product as produced by more expensive methods. The same consideration may, however, dictate use of silica glass, as now economically feasible, in lieu of other material, e.g., of low melting mixed oxide glass, to, in turn, manifest improved properties.

An important thrust concerns optical quality—the inventive processes permit, not only improved strength, stability and other properties associated with silica, but may avoid adverse optical effects as due, e.g., to porosity or bubbles. An important field addressed concerns optical fiber. While fabrication of the entirety of the fiber is contemplated as well, an important use involves fiber drawing from a composite preform consisting of a core rod enclosed within an overcladding tube. The overcladding tube is produced by sol-gel—the core rod by deposition using MCVD or a soot process.

Terminology

The arts involved, commercial as well as scientific, make use of a variety of terms which are not consistently applied, or which have some non-general, art-acknowledged meaning. The following definitions are largely in terms of a primary thrust of the invention—that of optical fiber.

Fumed Silica

Thus, the likely starting material for use in the sol-gel processing of the invention, is prepared by flame hydrolysis of an appropriate silicon compound, e.g. silicon tetrachloride, generally using an oxyhydrogen flame to yield particulate silica (silica powder).

Colloidal Silica

This terminology has the usual art-assigned meaning of particles of such size/mass as not to settle in some permitted period of time as included in suspension—so permitting formation of the required sol. The inventive process requires only such particle distribution/separation as to maintain the sol for the time required for gelation—under specified conditions. As a consequence, requirements tier the transitory sol state may be somewhat more relaxed than in other contexts.

Sol

A dispersion of colloidal particles in a liquid.

Gel

A sol which has been gelled so as to be essentially non-fluid. Gets consist of a network of bonded colloidal sol particles, initially with some still-present, interstitial, liquid. Processing contemplates removal of such liquid so as to result in a "dried gel".

Core Rod

A glass cylinder consisting of a core material surrounded by sufficient primary cladding material so as to, together, form the part of the preform yielding the primary, optically functional portion of the ultimate fiber. The core rod may be produced by vapor deposition methods now used in fiber fabrication—e.g. MCVD, VAD, OVD.

Overcladding

The core rod is inserted within an overcladding tube to yield a hybrid preform for fiber drawing. The overcladding is silica glass which may be doped to depress refractive index. The overcladding tube is of size to yield a fiber of desired properties upon drawing from the composite preform. Typically, the overcladding comprises at least 80–90% of the fiber preform volume. The invention provides for a sol-gel produced overcladding tube as direct replacement for now-available overcladding tubes prepared by other methods. Accordingly, such a tube, likely to be used in initial commercialization of the invention, is consolidated prior to insertion of the core rod. Alternatively, likely descriptive of later commercialization, the tube may be unconsolidated—may be still porous—upon insertion of the rod, in which event consolidation is attendant upon collapse during formation of the hybrid preform.

DESCRIPTION OF THE PRIOR ART

Silica glass, while generally more expensive than many other inorganic glasses, finds many uses based on its excellent properties. These include transparency, chemical inertness, low thermal expansion, thermal stability, and strength. Well-known uses for silica glass, as based on such properties, include optical fiber; optical elements—lenses and mirrors; beakers, muffles, crucibles and other containers profiting by chemical and thermal stability; and windows for use in high temperature environments, e.g., partitioning windows between regions of different temperatures, in which advantage is taken of tolerance not only for high temperature, but for significant temperature gradients as well.

A major thrust of the invention concerns silica glass as used in optical fiber. After some considerable worldwide effort directed to fabrication of fiber by use of low melting mixed oxides, the many advantages of silica glass were recognized as justifying the added material/processing cost.

Efforts at cost saving with regard to presently produced fiber—low insertion loss, minimum dispersion fiber—have taken account of the fact that a major portion of the fiber—particularly of the now-prevalent single mode fiber—is made up of material of little optical performance significance. Considering that the functioning part of the fiber—the core and inner cladding carrying 99+% of the optical energy—typically consists of but 5% of the mass, a significant part of this effort has concerned structures providing for overcladding of such inner portion. Advanced manufacture at this time often makes use of an inner portion constituting core and inner clad region as fabricated by Modified Chemical Vapor Deposition, or, alternatively, by soot deposition in Outside Vapor Deposition or Vapor Axial Deposition. This core rod is overclad by material of less demanding properties, and, consequently, may be produced by less costly processing. Overcladding may entail direct deposition on the core rod, or may result from collapsing an encircling tube. Such "overcladding" tubes, at this time, are commercially produced from soot or fused quartz.

Workers in the field are well aware of the economy to be realized in overcladding fabrication by use of an alternative procedure—by use of "sol-gel". This well-known procedure described, for example, in J. Zarzycki, "The Gel-Glass Process", pp. 203–31 in *Glass: Current Issues*, A. F. Wright and J. Dupois, eds., Martinus Nijoff, Boston, Mass. (1985), is seen as far less costly than procedures now in use. While the literature shows extensive worldwide effort, to date sol-gel has not found commercial use in fiber fabrication. The explanation generally entails cracking as occurring in the formation of expediently sized preform overcladding tubing, or, alternatively, the involved and expensive processing to which resort has been had for avoiding such cracking. A representative reference, T. Mori, et al, "Silica Glass Tubes By New Sol-Gel Method", *J. Non-Crystalline Solids*, 100, pp. 523–525 (1988), first alludes to the cracking problem, and then describes a crack-avoiding process entailing a starting mixture and forming process, both of which are involved and expensive. The example given in the paper yields a 300 gram body—in any event somewhat smaller than generally desired.

The cracking problem is emphasized in a recent paper by Katagiri and Maekawa, *J. Non-Crystalline Solids*, 134, pp. 183–90, (1991) which states, "One of the most important problems in the sol-gel preparation method for monolithic gels is avoidance of crack formation which occurs during drying". A 1992 paper published in the *Journal of Material Science*, vol. 27, pp. 520–526 (1992) is even more explicit: "Although the sol-gel method is very attractive, many problems still exist, as pointed out in Zarzycki. Of these problems, the most serious one is thought to be the occurrence of cracks during drying of monolithic gel". The reference then reviews remedies, e.g. hypercritical drying procedures and use of chemical additives such as N,N dimethylformamide, collectively referred to as Drying Control Chemical Additives. Both methods are regarded as expensive and, therefore, undesirable in routine glass production. The conclusion is that there is presently no satisfactory technique for the economic preparation of large glass bodies from gel.

To circumvent the cracking problem particularly in the preparation of large silica bodies, workers have attempted, not only supercritical drying and DCCA's, but even more sophisticated routes. (See, e.g. R. Dorn, et at., "Glass from Mechanically Shaped Preforms", Glastech, Ber., vol. 66, pp. 29–32 (1987,) and P. Bachmann, et al, "Preparation of Quartz Tubes by Centrifugal Deposition of Silica Particles", pp. 449–53 in *Proceedings of the 14th European Conference on Optical Communications*, Brighton, UK, IEE, Lond, U.K. (1988).

Small amounts of uncracked glass have been made by use of sol-gel. Examples are thin films of total mass of a fraction of a gram and small bodies weighing a few to a few hundred grams. Aspheric lenses and waveguide components (U.S. Pat. No. 5,080,962) are examples of small silica glass articles making use of sol-gel.

Approaches resulting in crack-free small bodies have not proven to be adequate for the larger bodies often required to realize the cost-saving promise of sol-gel. For example, expedient fiber fabrication generally entails drawing of tens of kilometers to hundreds of kilometers from a single—preform without the time and expense entailed in preform replacement. The desire for crack-free sol-gel preform tubes of requisite size—weighing a kilogram or more—has not been satisfied. The most relevant prior art is represented by U.S. Pat. No. 4,775,401, "Method for Producing Optical Fibers". The patent teaches direct overcladding of a core-rod by a dried sol-gel derived tube. It describes use of quaternary ammonium hydroxides to stabilize the sol followed by the use of an ester to bring about controlled gelation. An example in that patent speaks of the successful preparation of a crack-free 300 gram silica cylinder.

Efforts in this direction have included a number of other approaches. e.g., those of U.S. Pat. Nos. 4,059,658 (R. D. Shoup, et al) and 3,827,893 (H. Meissner, et al). These processes are based on precipitation of silica particles from solution. Some such processes depend upon use of solutions containing potassium silicate source material. The latter, as applied to more demanding use in turn requires leaching to remove the crystallization-inducing alkali metal ion.

Bachman, et al, cited above, depends upon a suspension of silica particles as initially introduced (rather than by precipitation) and depends upon centrifugal particle deposition. Problems associated with gelation are avoided.

Dorn, et al sidestep problems associated with sol-gel altogether by resorting to mechanical compaction of dry powder.

SUMMARY OF THE INVENTION

High-yield, low-cost, preparation of product entailing larger, near-net shape, crack-free silica bodies can be realized by casting from a sol of colloidal silica in water. The common feature of contemplated species is freedom from cracking, in turn, to result in improved yield, and, consequently, in lowered cost. In addition, the inventive procedures permit minimization of retained voids—of particular consequence for assuring transparency required for optical purposes. While generally of somewhat lesser consequence for non-optical use, this aspect of the invention results, too, in advantages in structural integrity.

With regard to product requiring optical properties—optical fiber, prisms, lenses, and the like—product may be of operating characteristics hitherto requiring more expensive processing. Similar considerations apply to product appearance—as related to transparency or simply to freedom from visible defects. In other instances, properties due to use of cost-dictated less expensive materials are improved without cost increase by reason of the now-permitted substitution of silica glass.

Silica particles comprising the sol, while of critical dimensions, may be of various size distributions. This is in contrast to current teachings, which maintain that large crack-free bodies require narrow size distributions to minimize drying stresses (Donald R. Ulrich, "Sol-Gel Processing", *Chemtech*, pp. 242–249, (1988)). The present invention allows use of a wide distribution of particle sizes. Accordingly, a variety of inexpensive commercial preparations are suitably used as starting material.

The procedure begins with preparation of the sol—an aqueous dispersion of silica particles. In exemplary procedures, stabilization of the sol is ascribed to electrostatic forces accompanied by high pH. A number of quaternary ammonium hydroxides are useful for such electrostatic stabilization. The negative surface charges produced on the colloid particles provide mutual repulsion to result in stable aqueous sols having high concentrations of silica while avoiding both high viscosity and aggregation. Gelation is, in this instance, the consequence of deliberate charge balancing accompanied by pH reduction. Introduction of positive charge, e.g. by adsorption of positive ions by the particles, dissipates the space charge and allows the silica particles to coalesce under the influence of. e.g., attractive van der Waals forces. A method of charge balancing which has resulted in acceptable tubes for overcladding on fiber preforms takes the form of pH reduction by addition of an appropriate ester, e.g. methyl formate, ethyl lactate, etc.

As contrasted with earlier approaches (those of U.S. Pat. Nos. 4,059,658 and 3,827,893 discussed in the previous section), the new procedure may make use of a sol of commercially-available silica particles. Conditions used in sol formation as well as in gelation affect the degree of dissolution of initially introduced particles. From the standpoints of economics and qualified end product, it has been found desirable to control the mount of added base. Inclusion of amounts of base in excess of that needed for desired pH results in increased silica dissolution. Satisfactory experimental results have entailed inclusion corresponding with dissolution of up to 50,000 ppm of silica.

In general terms, the inventive advance assures high yield of crack-free silica bodies—of bodies largely consisting of silica. In terms of a primary thrust, discussion is directed to production of large ($\geqq 1$ kg) sol gel bodies which are both crack-free and void-free at a level to assure desired properties of articles formed from such bodies—e.g., properties of optical fiber made from preforms including such bodies. A major finding of the invention depends upon increased yield in these terms as due to inclusion of a polymer of a specified category, sometimes as supplemented by a low molecular weight additive. The latter, generally a polyhydric alcohol such as glycerin is, in this description, described as "plasticizer," while the polymer is referred to as "binder". While this terminology is convenient, function of these additives in the present case is, in some respects, different from that of conventional plasticizers or binders. Both aid in avoiding cracking during article fabrication, but serve only a temporary function. They are of such nature as to be expediently removed without functionally meaningful residue at a later stage. The combination of these additives has been found to significantly decrease the cracking of sol-gel bodies—particularly of large sol-gel bodies ($\geqq 1$ kg) by controlling the gel structure. Extensive experimentation has demonstrated synergistic behavior upon inclusion of both such additives. As discussed in detail further on, the amount of polymer is far below that required to form even a monolayer on the silica particles. Restriction of polymer inclusion, to such amount—to much less than that needed for a traditional binder, is critical in that it provides for needed inter-particle bonding, while expediting removal and lessening residue. The same restriction in included polymer amount plays a crucial role in avoiding porosity of resulting product to, in turn, permit a high level of transparency as well as of properties assuring structural integrity during subsequent processing and in use.

A detailed review of current understanding of the forces influencing the binding of colloid particles is presented by R. G. Horn, *J. Am. Ceram.* Soc., 73, 1117 (1990). This article discusses the basic physics and chemistry, as well as the useful addition of polymers at conventional concentrations.

BRIEF DESCRIPTION OF THE DRAWING

Figures presented are with a view to expediting discussion of processing and materials contemplated in accordance with the invention. While intended as generally representative of the entire invention, explicit representation is in terms of a primary thrust—is in terms of fabrication of optical fiber.

DETAILED DESCRIPTION

General

Figure 1:
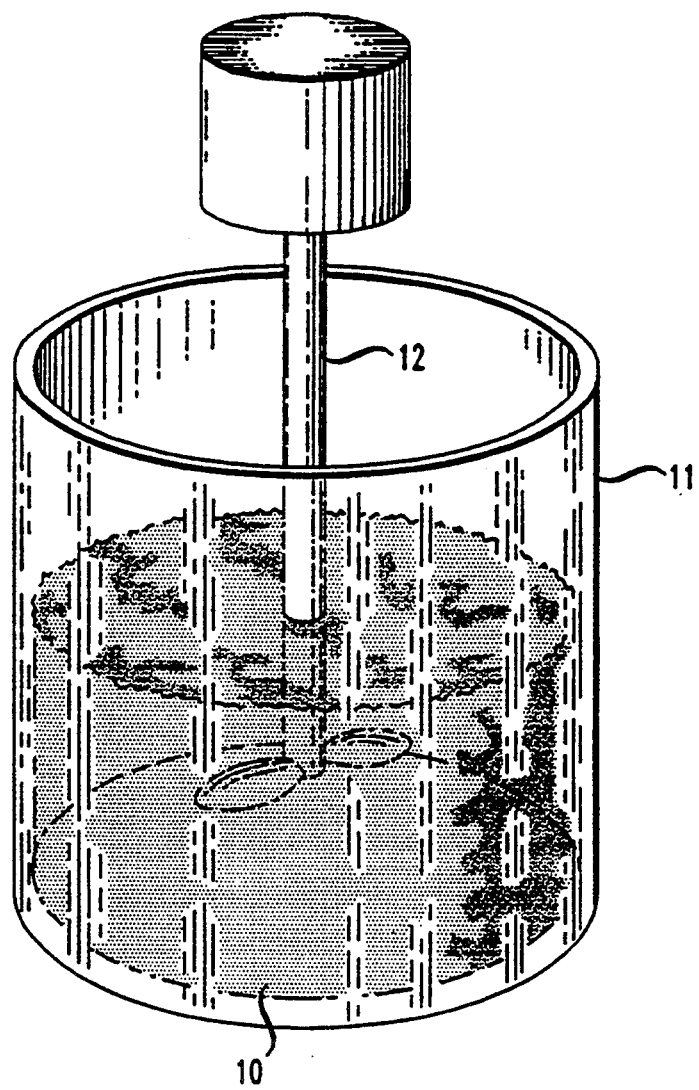
FIG. 1 is a perspective view of a receptacle provided with agitating means and containing a sol in preparation.

The essence of the problem addressed is briefly described. As above, discussion is primarily in terms of a demanding species of the invention—that of optical fiber fabrication.

Relevant optical fiber fabrication is expected to take either of two forms. Initial commercial use is likely to take the form of "rod-in-tube". As presently practiced, use is made of a core rod placed within an already-sintered, overcladding tube, generally as made by soot processing. It is expected that initial use of the invention will provide for replacement of this tube by one prepared by sol-gel.

Subsequently, the inventive procedure, as applied to fiber fabrication, may be used in the form of "direct overcladding" in accordance with which the composite preform is made by sintering an as-yet unsintered sol-gel tube containing the core rod. This approach, described in U.S. Pat. 4,775,401, issued Oct. 4, 1988, is preferred to rod-and-tube by most as: (a) avoiding the separate sintering step and, so, decreasing the total number of steps required; (b) lessening the significance of deformation to facilitate fabrication of the composite preform; and (c) lessening Polarization Mode Dispersion (as due to better assurance of circular symmetry).

An essential requirement of the preform overcladding tube is dimensional—it must have an inner surface which is both smooth and of constant diameter so as to snuggly mate with the core. Constant cross-section, consequently, constant outside diameter, is required as well. Precision, always demanding, is the more so for rod-in-tube—It may be useful to compensate for deformation by first straightening the tube. At the same time the overcladding tube should present constant mass and volume over its length to assure unwavering core-It-clad ratio during the drawing operation—an operation, which in a very real sense, magnifies any deviation from smoothness or dimensional constancy by a factor equal to the fiber-to-preform length ratio—possibly by a factor of $10^5$.

It is required, too, that composition be reasonably constant along the preform. To a certain extent, criticality is lessened by preferred practice in which the preform core body includes a thin outer region of clad material as grown in the same chamber and by the method used for the core—by e.g., MCVD or V AD—so that desired containment of light pulse is assured). Nevertheless local increase in index of refraction, particularly at the inner surface of the tube, detract to some extent from the primary function—that of providing reliably uniform containment of light pulses within the fiber core.

The challenge is formidable. As a prime example, temperature to be attained in processing of the already-cast body, should not be such as to allow migration, particularly non-uniform migration—either in terms of physical flow to distort the shape of the cast body to affect dimensional needs. Requirements are such that consequential defects may defy detection at the preform stage—may be recognized only by breakage during drawing, or by transmission loss or other performance penalty in use of the final fiber product.

Problems addressed here have their origin in physical defects. In certain instances, such defects may, in themselves, present a problem in terms of fiber operation. Appearance of milky white coloring is due to presence of defects—generally of voids—traceable, for example, to entrapment of gases during drying. The fact that such defects are visible is due to size—to a defining dimension at least equal to the wavelength of light within the visible spectrum. Their presence, particularly within inner regions of the overcladding—regions in proximity to the core—may result in transmission loss for traversing light pulses during fiber operation. The same appearance may, in addition, presage cracking/breakage brought about during further processing.

Need for care is evident at every stage of processing. Need for perfection in the mold has, in studies reported in this description, been satisfied by use of a polymer outer tube containing an inner mandrel of stainless steel. Surface smoothness as well as dimensional reliability, most demanding for the inner surface of the as-cast body for rod-in-tube fabrication, has been achieved and retained on such a mandrel for sufficient lifetime to satisfy economic needs—to lessen frequency of replacement or of repair. Required integrity for the outer surface of the casting has been satisfied by use of polymer material. Poly (methyl methacrylate) has shown sufficient resistance with respect to increased temperature and other conditions during molding, and has shown minimal consequential wear upon removal of cast tubes.

Use of excessive force in removal of the cast body from the mold must be avoided. A procedure found satisfactory has entailed: (1) placing the mold, containing the gelled body, in a vertical position; (2) removing the mandrel from the bottom (in most instances it slides out by itself—on occasion it may be pushed out by applying gentle pressure at the upper end surface); and (3) immersing the now hollow casting together with its outer mold tube in water as horizontally positioned and pushing the casting out of the mold. Buoyancy minimizes gravitational stress to measurably improve yield of crack-free castings.

Other precautions may avoid local strain gradients of consequence—e.g., employment of appropriate heating/cooling times. In some instances other conditions may contribute to reduced strain. Syneresis, migration of liquid—in this instance of sol water or other suspension medium—to mold-casting interfaces is useful.

The major thrust of the invention concerns minimization of defect introduction primarily as traceable to the sol and during gelation. While the precise mechanism responsible for defect introduction at the sol-gel stage is not directly observable, experimental results associate the problem with the nature of particle-to-particle contact. In addition to the extreme care require yield to meet economic goals in preferred embodiments depends upon inclusion of one or more additives to serve the transitory objective of avoiding defect introduction at this stage. In common with other requirements, any such additives must meet the primary requirements stated—e.g., must not require attainment of temperatures of greater than ~300° C. for thin removal in the instance of silica-based fiber. It is fundamental that such additives must not result in residue harmful to fiber operation. In general, this translates to permitted contamination below the ppm level with regard to most consequential contaminants. Satisfactory results have been assured by use of additives which are removed during early processing of the cast body—for the most part, prior to firing.

Significant yield improvement is the consequence of what is here referred to as "binder". The inventive advance depends upon incorporation of an organic polymer. Polymer is chosen, inter alia, to be removable without costly additional processing—a need which, in accordance with usually contemplated processing temperatures is met by decomposition in air to yield chemically benign gaseous product at temperatures used in processing, e.g. of the order of 300° C. As will be seen, the very use of the term, "binder", represents an oversimplification. Studies have indicated that glass-to-glass contact should be limited. Yield improvement in accordance of the invention is provided by polymer presence at particle-to-particle interfaces. It apparently serves to reduce brittleness while at the same time modulating interfacial forces to avoid crack nuclei. In this way, it provides for structural integrity prior to firing. Study may, in fact, suggest that operation of the polymer is as an "anti-binder" in the sense that flexibility is increased at interfacial contact regions.

Leaving the precise nature of the responsible mechanism aside, it is found that quantity of "binder" is critical. It is found that inclusion in amount required in traditional terms—inclusion in amount sufficient to result in at least a continuous monomolecular layer over the entirety of all of the glass particles—reduces efficacy. In general, use of binder in amount greater than 50% of that required for particle coverage—for an unbroken monomolecular layer enveloping all particles—is not desired. Use of traditional amounts—in excess of that required for 100% coverage—results in sufficient void formation to impart a milky white appearance in the fired product. Use of 10% or less on the same basis has resulted in retention of transparency while avoiding defects. For sol particles of the order of 40–60 nm. in size, and for usual sols containing perhaps 40–50 wt. % of glass in suspension, the amount of contemplated polymer is generally less than 1 wt. % preferably 0.5 wt. % or less.

The conservative limitation on polymer inclusion is experimentally verified. In fact, real conditions correspond with significantly lesser coverage. Amounts of polymer found suitable have been indicated in wt. %. Exceeding maxima indicated result in excessive polymer—therefore in excessive polymer decomposition product—therefore in needless void formation. Conversion to coverage of a monomolecular layer is based on assumed density close to 1 gm./cm$^3$, on molecular segment dimension of ~5 Å, and most importantly on an aliphatic polymer of perfectly packed form, i.e., uninterrupted coverage as conforming with the particle surface presented. It is clear that actual coverage will be less. Nevertheless, coverage indicated—coverage not to exceed 50% in the terms discussed—is a useful limitation. Incorporation of polymer corresponding with coverage below this limit has been found adequate.

Reliable positioning of so small an amount of polymer at critical particle-to-particle interface is believed to be a consequence of adherence—of the reduction in free energy resulting from wetting of adjoining, closely spaced glass particles. Polymer materials yielding best results are reversibly chemisorbed on the particle surface—i.e. on the colloidal silica surface. (Reversible chemisorption, the phenomenon whereby chemisorbed polymer may be moved may be desorbed and chemisorbed at a different position on the silica—is discussed in the above-cited article by R. G. Horn.) Assured positioning is considered to be the consequence both of some initial polymer flow as well as of particle movement which is arrested upon polymeric joinder.

A variety of available polymeric materials meet requirements:
1. Solubility in the sol suspension fluid—solubility of at least 5 wt. % (at least 5 grams of polymer/100 grams of sol) is easily satisfied in the usual instance of aqueous sol.
2. Molecular weight to afford required distribution for assure positioning at particle-to-particle interfaces without requiring excessive amount (thereby avoiding excessive void formation). Molecular weights up to one million are usable although an upper limit of 500,000 is preferred. Most of the work reported in this description is based on molecular weights in the range of 10,000–100,000.
3. Wetting of the particle surfaces presented, preferably as enhanced by reversible chemisorption.
4. Preferably as synthesized by either cationic, condensation, or radical polymerization for reasons of economics. The general requirement is freedom from harmful residue upon removal by thermal decomposition. Of particular consequence are the alkali metal ions which may serve as devitrification centers—as crack nuclei. It is desirable to maintain, e.g. Na, K at levels below the 100 ppm level as based on the gelled material. Reagents containing such ions should be avoided. This, in turn, results in designation of a preferred class which is polymerized by use of other types of catalysts. Polymers used in experimental work, e.g. polymers of the lower alkyloxazolines, am prepared by acid catalysis.
5. Removability by thermal decomposition, generally in air (without meaningful residue). Satisfactory use has been made of polymers of aliphatic groups comprised in their entirety of atoms of C, H, 0, N, as well as those containing moieties providing for effective removal by volatilization of other atoms—use has been made of polymers containing halide-substituted quaternary ammonium substituents (in which chlorine or other halide serves as counter ion).
6. The polymer is stable under conditions to be encountered—e.g., in terms of conditions used experimentally, it was necessary that it be essentially unchanged by exposure for twenty-four hours to aqueous solution maintained at pH of 11–14.

With regard to requirements of the polymer itself, needs are easily satisfied. Many of the common water-soluble polymers meet the wetting requirement serving as drive force. Exemplary categories are discussed further on.

Use of "plasticizer" has been discussed. Glycerin is exemplary of the class. Amount incorporated as well as freedom from contaminant inclusion is as discussed in conjunction with "binder". Attention to processing conditions after removal from the mold assures best yield. Drying while rotating, by supporting, rotating rods, has been found helpful in maintaining shape and integrity. Conditions during firing are as critical. Processing found acceptable to date has benefited by heating in air ambient to temperatures in the 120°–300° range as slowly attained—for the >1 kg overcladding tubes contemplated—over a range of from 3°–10° C./hr. The invention depends on high yield of shaped bodies of low defect sol-gel silica glass bodies. The advance is due to inclusion of members of one or both of two classes of additives as discussed above.

The inventive advance is appropriately described in terms of the polymer additive common to all satisfactory experimental results. While the second additive, e.g. glycerin, itself results in increased yield as well, its use is most significant in combination with polymer. Extensive experimental study uniformly shows synergy where both additives are present. In general, where polymer content is within the ranges indicated, inclusion of second additive as well in found to result in yield of satisfactory product which exceeds simple additive yield of the two by at least 50%.

Yield improvement is of consequence for the entire category of product as based on use of sol-gel, high silica ($\geq 95$ wt. %) glass bodies. While applicable with little regard to size, the inventive approach is of particular value for larger bodies such as kilogram or larger bodies in the fabrication of optical fiber.

Consistent with other approaches, processing conditions, material purity, etc., are all such as to assure requisite quality—e.g. as limiting consequential impurity to very low level in the fabricated article. With regard to the additives upon which the inventive advance depends, they are chosen so as to be free of difficultly removed ingredients known to be detrimental in the final article, e.g., in optical fiber.

Attention to the foregoing assures the inventive results. Factors are sol stabilization, e.g., by use of a quaternary ammonium hydroxide; conditions resulting in gelation, e.g. the amount of methyl formate or other pH-reducing ester, as well as inclusion of polyhydric alcohol and polymer. Proper choice of all included materials—both in kind and amount—permits successful removal of harmful residue during heat treatment—e.g., to reduce amounts of transition metal ions and alkali metal ions—detrimental to the properties of optical fibers.

Although the accomplishment of drying large gel bodies without cracking has been elusive, there are many theories as to the cause of such breakage. Many of these look toward the effects of capillary stress as initiating such breaks. Such stress is inversely proportional to the pore radius. Thus, minimization or elimination of small pores is desired. In the present instance, our processing produces a gel structure characterized by a minimum concentration of small pores (<15 nm in diameter) and having a narrow distribution of pores in the vicinity of 50 nm in diameter.

These are pore sizes measured by mercury penetration porosimetry. This well known diagnostic procedure is described for example in S. Lowell, *Introduction* to *Powder Surface Area*, Wiley, 90–99, 181–189 (1979). Achieving such a distribution depends upon many features, among which are:
1. Average particle size of the silica
2. Distribution of the particle sizes
3. Loading of sol
4. Concentration of electrolytes in the sol and its chemical nature
5. Concentration of base used to stabilize the sol and its chemical nature
6. Concentration and nature of gelling agent and/or salt or surfactant used to cause gelation
7. Quantity of silica dissolved in stabilized sol
8. Nature and quantity of polymers and polyhydric alcohols in the sol
9. Synergism between the additions of 8.

In contrast with the common use of polymers as binders, the present very low concentration seems insufficient to produce particle adhesion usually associated with a binder. Rather, it serves to control the structure of the gel and by this means to regulate the pore size distribution.

Processing/Materials

Description hem is in terms of sequential processing steps. For the most pan, discussion is in the order of such steps and, where explicit, refers to steps/materials as contemplated in the fabrication of optical fiber. Numbered steps and detailed description are with a view to disclosure of most likely processing in such fabrication. Steps set forth may be reduced or increased in number. The inventive advance, as primarily concerning matter in steps numbered 3 and 4, is defined in accordance with appended claims.

Numbered steps are first set forth in tabular form based largely on explicit illustrative ingredients. It should be kept in mind that tabular entries are just that—illustrative. As discussed in detail elsewhere in this specification, useful variations may go well beyond those set forth in the table—in some instances may, in tact, be inconsistent. As an example, wt % $SiO_2$, while amply supported by experimental work most closely approaching expected initial commercialization, is not consistent with extremes—in this instance is not consistent with the permitted range of free particle surface presented. All such inconsistencies are to be resolved in favor of prose description in the specification.

TABLE

| PROCESSING STEP | RANGE Preferred | RANGE Broad | CONSEQUENCES Too Low | CONSEQUENCES Too High |
|---|---|---|---|---|
| 1. Mix silica + water | | | | |
| a) silica ($m^2/g$ surface area) | 30–60 | 20–100 | settles out | pores too small, viscosity too high |
| b) wt % $SiO_2$ | 40–50 | 30–60 | excessive shrinkage and cracking | excessive viscosity, pore entrapment rapid gelation |
| c) temperature (°C.) | 20–40 | 0–100 | freeze poor dispersion | boil, excessive evaporation |
| 2. Mix TMAH | | | | |
| a) wt % based on $SiO_2$ | 1.6–3.2 | 1–6 | slow gelation, soft gels | rapid gelation, brittle gels non-transparent glass |
| b) mixing time (min) | 3–8 | 1–30 | poor mixing | contamination, sol heats up |
| 3. Mix polyethyloxazoline | | | | |
| a) wt % based on $SiO_2$ | 0.1–0.6 | 0.05–1 | tendency to crack | non-transparent glass |
| 4. Mix glycerin | | | | |
| a) wt % based on $SiO_2$ | 0.5–2 | 0–10- | tendency to crack | gel too soft |
| 5. Aging | | | | |
| a) aging time (hr) | 1–20 | 0.5–200 | poor gelation | brittle or cracked gel |
| b) aging temperature (°C.) | 20–30 | 10–60 | inconvenient, slow | brittle or cracked gel |
| 6. Add gelation agent (equivalents*/TMAH) | 1.2–1.4 | 0.5–2 | too soft | brittle or cracked gel |
| 7. Pour into mold, deaerate | N/A | N/A | N/A | N/A |
| 8. Gel aging (hr) | 1–24 | 0.25–100 | soft, weak gel | brittle or cracked gel |
| 9. Extraction of gelled body | N/A | N/A | N/A | N/A |
| 10. Gel Drying on Rollers | | | | |
| a) Temp (°C.) | 10–30 | 0–80 | too slow | weak dried body, cracked gel |
| b) RH (%) | 75–95 | 30–99 | cracking, weak dried body | too slow |
| c) Rotation (rpm) | 0.1–1 | 0.01–10 | deformation | exfoliation of surface |
| 11. Removal of Volatiles (including organic materials) | | | | |
| a) Temperature (°C.) | 120–300 | 100–500 | cracks when heated | unnecessary, interferes with dehydroxylation |
| b) Heating rate (°/hr) | 3–10 | 1–50 | slows process | cracking |
| c) Atmosphere (% $O_2$) | 20 | 5–100 | carbon residue | ignition of organics |
| 12. Dehydroxylation | | | | |
| a) Temperature (°C.) | 500–1000 | 300–1100 | OH and metals remain | traps $Cl_2$, $O_2$ and impurities |
| b) Time (hr) | 1–5 | 0.1–20 | OH and metals remain | expensive, no added value |
| c) Atmosphere | | | | |
| 1. $Cl_2$ (%) | 3–6 | 1–100 | OH and metals remain | excessive incorporation in glass |
| 2. $O_2$ (%) | 0–10 | 0–90 | residual carbon | OH and other impurities remain |
| d) Heating rate (°C./hr) | 100–200 | 50–500 | slows process | furnace damage, cracking |
| 13. Sintering (30 cm hot zone) (He atmosphere) | | | | |
| a) Temperature (°C.) | 1300–1500 | 1200–1750 | incomplete densification | excessive deformation, expensive |
| b) Pull rate (cm/hr) | 15–100 | 5–200 | process slow, excessive | cracking, incomplete densification |

| | RANGE | | CONSEQUENCES | |
|---|---|---|---|---|
| PROCESSING STEP | Preferred | Broad | Too Low | Too High |
| | | | | deformation |

Table Notes:
N/A = Not Applicable
Where temperature range is not specified, room temperature (e.g., 15-30° C.) is used.
*Number of compensating units, i.e., number of hydrogen-yielding units in the pH-lowering compound as divided by the number of Oh-yielding units in the pH-increasing compound The Table includes both preferred and broad ranges of inclusion, as well as briefly-stated consequences of operating outside such ranges. The following text is similarly numbered and generalizes on the Table.

1. As discussed, the major impetus is economics with preservation of properties associated with more expensive fabrication techniques. It is a significant feature of the invention that use may be made of standard commercial materials, e.g. of purity satisfactory for non-demanding uses. For example, the starting fumed silica is of grade and cost as used in manufacture of floor waxes or for lessening gloss as a shellac or paint additive, etc.

Starting materials are set forth in terms of necessary inclusions. Other ingredients, intentionally added or permitted as tolerable impurities may be present. As defined under "Terminology" above, starting material may be formed by flame hydrolysis of a suitable compound starting material, e.g. $SiCl_4$. Commercial fumed silica adequate to meet fiber fabrication requirements of the invention is readily available.

General comments preceding the table are no place more consequential than here. For pedantic purposes, it is useful to set forth included amounts of silica particles as a separate unmodified entry. Ranges indicated are, in fact, suitable without reservation as applied to particle size and distribution likely to constitute initial commercial use. Permitted variations in size and distribution, however, go beyond weight percent ranges indicated—e.g., would suggest in excess of the ~50% particle coverage maximum which is an integral part of the invention. The same tabular entry—PROCESSING STEP 1.—calls for water as the suspension medium whereas, as elsewhere indicated, this preferred medium may be modified or replaced by another.

In similar fashion, product as supplied by different manufacturers may vary. While not explicitly set forth in manufacturing specifications, variations in properties have resulted in differences in processing ease, speed, and economy. Such variations have been traced to variations in particle size distribution as among products of the same nominal particle size. While the specification teaching is based on exhaustive experimentation and while adherence to all considerations set forth satisfies inventive requirements, optimization will depend upon extensive experience.

As stated in those comments, inconsistency as between tabular entries and inventive requirements elsewhere set forth are to be resolved in favor of the latter.

2. For purposes of shipping and storage, stable aqueous sol of fumed silica particles may contain small mounts of organic base material such as Tetra Methyl Ammonium Hydroxide. In general, the amount of base so included is insufficient to result in pH within the range of from 11 to 14 as preferred for successful formation of large shaped gel bodies. Accordingly, pH is now regulated by addition of TMAH or other suitable material to bring within it the indicated range.

For many purposes, after mixing, the resulting sol is permitted to equilibrate—a period of up to twenty hours at room temperature has been found sufficient. Equilibration may be for a lesser period. A separate equilibration step may be avoided altogether where gelation is not to be initiated immediately.

Extensive experimentation has identified preferred sols in terms of silica concentration and viscosity. Viscosity is of consequence from a number of standpoints—it is desirably kept below some maximum level from standpoints of sol preparation (elimination of bubbles, uniformity of dispersion—both under acceptable temperature-time conditions); sufficient fluidity to assure expedient castability and to facilitate removal of entrained air or other gas. A viscosity range of 50-250 centipoise as measured at ambient temperature has been found acceptable.

TMAH is illustrative of the category of quaternary ammonium hydroxides. This material serves to stabilize the colloidal sol (against particle agglomeration and resultant settling), as attendant in increase in pH. It also results in dissolution of small amounts of silica (from 10 ppm to 5 wt. %) which may aid in forming particle-to-particle bonds, thereby increasing gel strength and further lessening cracking tendency. Suitable alternatives to TMAH include higher homologs, e.g. the corresponding ethyl compound, and also mixtures and chemically related material. From the standpoint of cost and expediency, the simple methyl or ethyl compound is likely chosen. For convenience in this description, reference is often made to the prototypical TMAH. Use of this designation is not intended to be limiting, but is intended to be representative of the class described. The contemplated stabilizers are generally included in aqueous solution for convenience. Solubility of the methyl compound permits formation and use of a 25 wt. % solution. The ethyl homolog, tetraethyl ammonium hydroxide, is of some advantage due to more facile decomposition during the low temperature heating step (during step 11 of the Table).

3. Polymer added in this step constitutes the first additive as required in accordance with the teaching. While set forth as a separately numbered step on the Table, the order of numbered steps 3 and 4 is of no consequence—in fact, the two may be combined into a single step.

Polyethyloxazoline is illustrative of polymers that are effective in increasing crack resistance of gelled bodies in accordance with the inventive teaching. From the standpoints of efficacy, cost, and removability, and in terms of usual suspension medium—of water—the generic class is that of the water soluble aliphatic polyamides. The class includes the lower homolog, polymethyloxazoline, which also incorporates the amide function in the polymer backbone. Polyacrylamide is illustrative of useful polymers which include the amide as a pendant grouping. The latter materials are conventionally synthesized by polymerization of the monomer in water solution in the presence of conventional water-soluble radical initiators. As elsewhere, alkali metal cations are desirably avoided as polymerization catalysts since, to the extent retained, they tend to catalyze crystallization of the silica during the sintering step 13. As with other precautions, significance depends upon criticality of the final article—particularly for non-optical use, retained alkali metal ion, initially introduced as polymerization catalyst, may be of little significance. Polymer molecular weight in the range 10,000–100,000 has been found suitable for the named polymers although up to a million has served.

There has also been success in using polymers that are employed in water purification: the Magnifloc series sold by American Cyanamid. These materials are synthesized from dimethylamine and epichlorohydrin with small amounts of chain-branching diamines. They are inherently highly cationic, containing [—CH$_2$—N$^+$(CH$_3$)$_2$—CH$_2$—] units in the backbone. Copolymers containing both amide and quaternary ammonium groups are a useful class of polymers meeting requirements.

As noted, the amount of polymer employed is far below that required to form even a monolayer on the silica particles, and the mode of action is thus distinct from that of a conventional binder. While greater amounts may serve the primary objective of minimizing cracking, they are generally to be avoided due to increased volume of gas evolution upon decomposition. Resulting pores lead to bubbles in the glass which persist through subsequent processing—of particular consequence with regard to optical quality as in optical fiber.

A possible mode of action invokes the influence of the polymer at the contact points of the silica particles, where the surface-to-volume ratio is exceptionally high and interparticle adhesion forces are critical to strength (see, R. K. Iler, *The Chemistry of Silica*, Chapter 3, John Wiley and Sons, New York (1979))—i.e., to effectively counter cracking tendency.

4. Glycerin is exemplary of the class of low molecular weight surface modifiers constituting second additive and an important part of the inventive teaching. Extensive experimentation establishes the suitability of glycerin. Based on cost considerations, it is likely that this will be the material of choice. Alternative materials are generally of the class of polyhydric alcohols and include such compositions as ethylene glycol and 2-methylpropane-1,2,3 triol. Them is some reason to consider that the low molecular weight additive is of benefit in preventing brittle fracture of the gel, both in step 9 and in early stages of step 10. As noted, each of the additives of steps 3. and 4.—polymer and, e.g., glycerin, itself has a marked effect on crack minimization. Preference for inclusion of one of each of such additives is suggested on the basis of extensive experimentation in accordance with which addition of a member of the second class of additives results in degree of crack freedom which, on one measure, represents a 50% improvement over the simple sum of the effects of the two.

5. This item of the Table is self-explanatory. Aging provides for equilibration.

6. At this stage charge neutralization, illustratively involving pH reduction, induces gelation. Reduction to a pH value, depending upon starting level, typically to a level below 11 or 10, is typically accomplished by addition of a water-soluble hydrolyzable ester. Useful compositions include methyl formate, as well as higher homologs, e.g. ethyl, isopropyl, etc. Other materials may be used to decrease pH to the level indicated. The specific compound and amount are chosen such as to bring about the desired rate of gelation. In one instance gelation was attained in a period of 8–10 minutes by addition of methyl formate in the amount of 1.28 equivalents relative to added TMAH for a sample containing 2.7 wt. % TMAH (based on $SiO_2$).

The ester used to induce gelation functions by consuming the alkali through hydrolysis to form the tetraalkylammonium salt of the parent acid and the alcohol used to form the ester. The rate at which this process occurs is important. As indicated, too fast a rate of gelation is inconvenient for casting the sol, and too slow a rate impacts production cost. As suggested, cooling of $\approx 10°$ C. below room temperature has been found useful in the instance of methyl formate inclusion. The rate of the hydrolysis reaction is affected as well by the strength of the parent acid (pKa) and by steric factors in the ester molecular structure that impact the attack of hydroxide ion on the ester carbonyl group.

The need for cooling may be avoided by appropriate choice of ester. For example, methyl glycolate, methyl lactate and ethyl lactate consume alkali at a slower rate and, so, may permit more time to assure proper filling of the mold at room temperature—i.e. may lessen desirability of cooling. Further, these esters offer advantages over formates in that volatility as well as toxicity are reduced while maintaining sufficient water solubility.

As indicated on the Table, following initiation of gelation, the material is again aged to allow the gel to strengthen so that it will maintain its cast shape upon removal from the mold so that it will and withstand subsequent handling.

7–8. These items are self-explanatory.

9. Removal of the sol-gel body from the mold is accomplished with minimal force to avoid the formation of cracks that eventually cause failure. Mold and contents may be immersed in water or other liquid so that the body is supported during extraction. The body is desirably then transferred directly to the support rollers for drying.

10. The gelled body is dried with rotation to assure uniform drying. Experimental work made use of supporting rollers rotating the body about its axis very slowly—at less than 1 rpm. Drying to remove $\approx 98\%$ of included water is conveniently accomplished at this stage. Scheduling to completion may be in accordance with before and after weight as determined in a trial run. Drying of $\approx 1$–2 kg bodies to this level has been accomplished in a period of one or two weeks in a 60–80% relative humidity atmosphere at 15°–20° C. Larger bodies with lessened surface-to-volume ratio require longer drying times or increased temperature.

11–13. Objectives of the various stages of heat treatment are separately stated in the Table. The overall Objective in the instance of near term fiber fabrication, is, as discussed, a self-supporting overcladding tube—consolidated insertion of core rod (rod-intube) or after (direct overcladding). Upon consolidation, the tube is no longer opaque white but translucent or transparent in appearance to the naked eye.

The first stage of heat treatment is the removal of residual molecular water and any organic material. This is accomplished by heating slowly from ambient temperature to a temperature in the indicated range in flowing air or in a $Cl_2$, $N_2$, $O_2$ mixture. The exact upper temperature chosen is dependent on the particular organic materials to be removed.

Reference is made to the figures: first in elaborating on discussion of processing this stage; thereafter with reference to subsequent processing.

Figure Description

Figure 2:
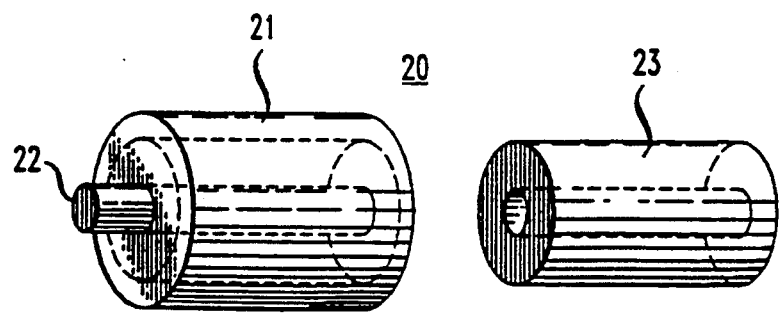
FIG. 2 is a perspective view depicting a shaped gelled body as withdrawn from a mold.

FIG. 1, depicting receptacle 10, contents 11, and agitating means 12, is representative of the initial step in which starting ingredients, perhaps including fumed silica and water as discussed in the preceding section, are processed. FIG. 2 depicts a mold 20, consisting of outer retaining tube wall 21 and mandrel 22 from which the now-shaped sol-gel body 23 (in this instance, tubular body 23), has been extracted. Gelation, under conditions described in the Examples, typically required a period of from five to sixty minutes at the temperature indicated. Mandrel 22 was a separate element, and was, in fact, removed from body 23 before its extraction from mold tube 21.

Figure 3:
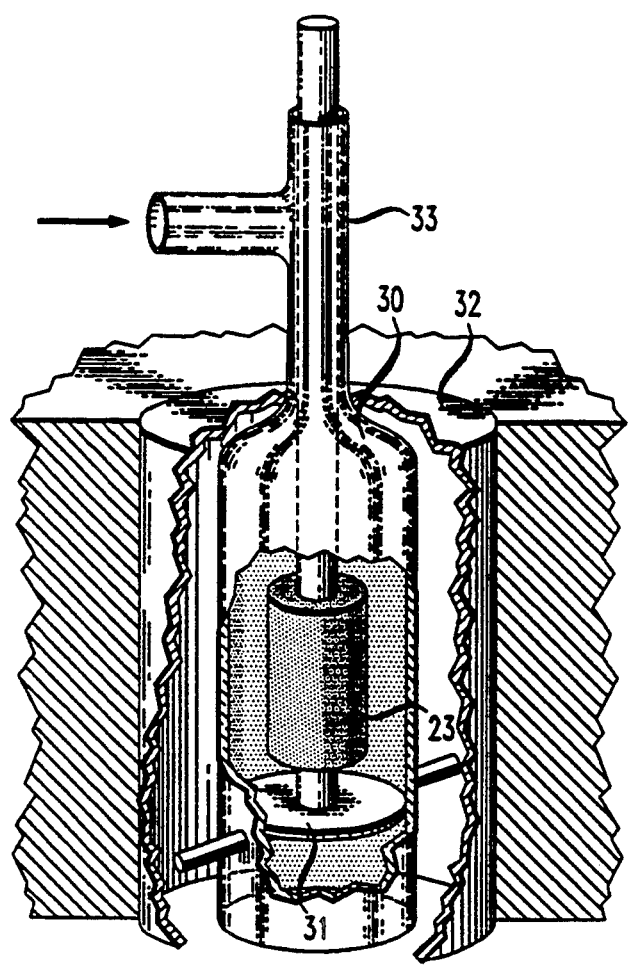
FIG. 3 is a perspective view, partly in cross-section, depicting the gelled body now in the next stage of processing as supported within a furnace shroud, e.g. for dehydroxylation and likely for consolidation as well.

FIG. 3 depicts body 23 at the next stage of processing. Dehydroxylation is accomplished within fused quartz shroud 30 in mixed atmosphere of helium and chlorine, or in mixed atmosphere of helium, chlorine and oxygen. The shroud is used for experimental convenience to avoid the complication of sealing the furnace muffle from the ambient atmosphere but is not necessary for practicing the invention. As initially inserted, body 23 is supported by quartz plate 31, and shroud and contents are lowered through the hot zone of furnace 32. A residence period of $\approx$ two hours within a furnace maintained at a peak temperature of 1000° C. resulted in substantially complete dehydroxylation and in removal of transition metals. Most important from the standpoint of needed freedom from loss-inducing contaminants, conditions noted result in a purified body of quality approaching that producible by far more expensive processing. Permitted variations in processing conditions are described in detail in "Influence of Dehydration/Sintering Condition on the Distribution of Impurities in Sol-Gel Derived Silica Glass", J. B. MacChesney, et al, *Mat. Res. Bull.*, 22, pp 1209-21 (1987).

For the particular arrangement shown/discussed, the now-purified body, still supported on plate 31, is at a position below the hot zone of furnace 32. The flowing atmosphere is made helium-rich ($SiF_4$ can be added to reduce the refractive index), and the furnace temperature is raised to attain a maximum hot zone temperature of 1300°-1500° C., following which shroud 30 is moved upwardly at such rate as to achieve sintering as visually evidenced by shrinkage and transparency. Body 23, still supported by tube 33, has contracted $\approx$25% (in length). Traversal rate through the hot zone was $\approx$15 cm/hr which under one set of conditions, corresponded to a residence time at hot zone temperature of about ninety minutes. Rates as high as 100 cm/hr in the same equipment and under the same conditions yielded satisfactory results.)

Subsequent Processing

The Table information terminates with sintering to yield a self-supporting pore-free body—in the instance of fiber fabrication, in an overcladding preform tube.

Figure 4:
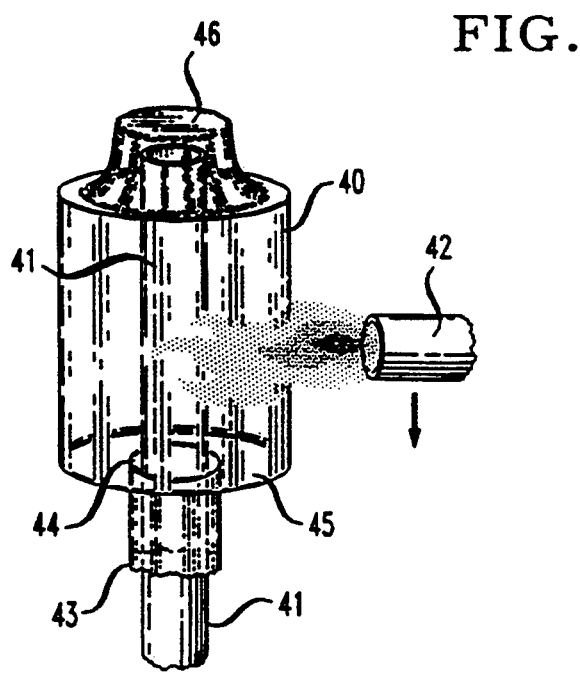
FIG. 4 is a perspective view depicting the now-consolidated tubular body with an inserted core rod in the course of tube collapse.

In FIG. 4 the now-consolidated tubular body, here denoted 40, is shown with an inserted core rod 41 in the course of collapse by heating with torch 42 so as to bring about intimate contact between the two, and thus produce a preform for drawing optical fiber. In the particular apparatus depicted, collapse to assure intimate contact is facilitated by evacuation within encircling evacuation tube 43. The interfacial region within overcladding tube 40 and core rod 41 is sealed at the upper end by silica cap 46, and at the lower end by a seal at the juncture between tube end 44 and overcladding tube surface 45. Bubble-free structures have been reliably produced by maintenance of such interfacial region at a pressure of 30-50 m torr.

Production of fiber from hybrid preforms of the invention does not depend upon the particular means by which the core structures are produced. Satisfactory structures have been made using core rods made both by MCVD as well as by VAD. The use of the substrate tube in usual MCVD fabrication may result in somewhat increased cladding percentage (greater values of D/d in which D is overall diameter of the core rod and d is the core diameter). Experimental work resulting in satisfactory overclad structures in accordance wish the invention has depended on D/d ratios of 4-6 for MCVD and of 3.0-4.5 for VAD, respectively.

Figure 5:
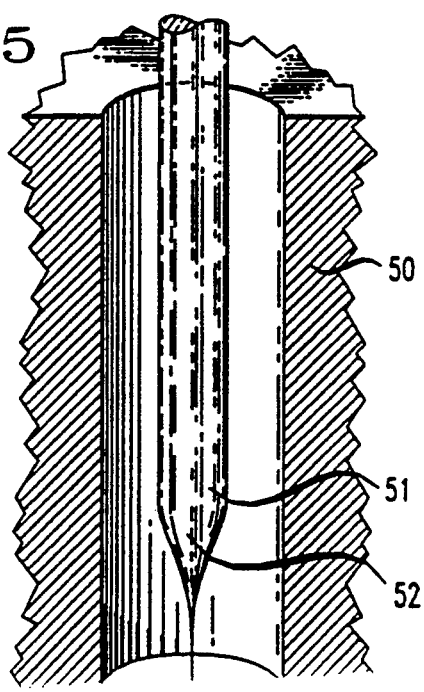
FIG. 5 also in perspective but partly in section, shows the preform, as consisting of core rod together with intimately contacting overcladding, in the course of fiber drawing.

The final figure, FIG. 5, depicts the collapsed overclad core rod 51 as produced in the procedure depicted in FIG 4. The drawing procedure, described for example in F. V. DiMarcello, et al, "Fiber Drawing and Strength Properties", pp 179-242 in *Optical Fiber Communications*, ed. T. Li, Academic Press, New York (1985), simply entails heating within furnace 50 to increase temperature of preform 51 to the softening point at region 52 thereby resulting in fiber 53 as drawn by means not shown.

EXAMPLES

Example 1

The production of communication grade optical fiber by procedures of the invention involves three steps: the preparation and consolidation of a gel-derived vitreous silica overcladding tube, the fusing of this tube about a vapor-derived core rod and the drawing of the composite preform to fiber.

In this example, the overcladding tube was prepared from a 2500 gram aqueous dispersion of fumed silica. The dispersion contained 46 wt. % colloidal silica having a surface area of approximately 50 $m^2/g$. The particle size distribution centered about 50 nm diameter and extended from 5 nm to 100 nm. To the dispersion, a quantity of tetramethylammonium hydroxide (TMAH), (2.8 wt. % based on $SiO_2$—both as dry weight) dissolved in water (25 wt. %), was added. This raised the pH to approximately 12 and stabilized the sol against gelation and settling. After twenty hours, 0.21 wt. % polyethyloxazoline of molecular weight $\approx$50,000 (measured by gel permeation chromatography with polystyrene standard) and glycerin (0.87 wt. % both based on $SiO_2$) were added and mixed with the sol. Methyl formate (2.1 wt. % based on $SiO_2$) was added and the sol was immediately poured into a mold. The mold consisted of an acrylic tube and concentric stainless steel rod, together providing for a tubular casting of dimensions 63.5 mm OD×28.6 mm D×1 meter long. The sol gelled within ten minutes after the ester was added. The pH decreased to a value in the 9.6–9.7 range over a ten minute period following addition of the formate to result in substantially complete gelation.

The gel tube was removed from the mold and dried horizontally on rotating 2.5" diameter rollers spaced at 3". Rotation at 1 rpm for a period of two weeks within a loosely closed box yielded an unwarped dried tribe, 25.1 mm ID×55.6 mm OD×844 mm long (corresponding to shrinkage of 12.4%). The reported results were obtained at room temperature and relative humidity of ≈80%.

The dried tube was placed in a fused quartz firing shroud (FIG. 4). The firing shroud was supported on an elevator which moved the sample vertically through a 12" long furnace hot zone. During firing, the body was supported by a 19 mm rod which extended 11.3 cm into the center hole of the unsintered tube. The sample was positioned above the hot zone in a flowing atmosphere of He, $O_2$ and $Cl_2$ while the furnace was heated to the dehydroxylation temperature of 1000° C. The furnace was maintained at this temperature for 16 hours while the sample was slowly lowered through it. With the sample at the bottom, the furnace temperature was increased to 1400° C. and the sample was consolidated by raising it through the hot zone. As a result of consolidation, the tube shrank an additional 27%, reducing its internal diameter to 18.3 mm, thus fusing the tube to the 19 mm support rod. The fused portion, ≈8 cm long, was removed, leaving a tube of length ≈59 cm.

A core rod was produced by MCVD having a $GeO_2$-doped core ($\Delta^+ = 0.27\%$—i.e., index of refraction 27% above that of undoped silica), a fluorine-doped cladding ($\Delta^- = 0.11\%$—i.e., index of refraction 11% below that of undoped silica) and an outer diameter of 16 mm. The rod was inserted into the tube and the composite preform was produced. Briefly, fabrication entailed use of a vertical lathe and a surface burner to heat the core rod and overcladding tube. A vacuum of 25–27 inches of mercury aided in collapse of the sol-gel tube onto the core rod. The assembly was rotated at 10 rpm and fused, top-down, at a rate of 1.2 cm/minute. Overcladding temperatures were sufficient to accomplish several objectives: (1) removal of remaining pores in the sol-gel tube, (2) collapse of the tube onto the core rod, and (3) fusion at the tube-core rod interface. This procedure produced a straight cylindrical body. The resulting preform had a 2.6 mm diameter core and 40 mm OD. Preparation details were in accordance with the teaching of U.S. Pat. No. 4,820,332.

The preform was drawn to fiber 125 μm diameter using a $ZrO_2$/RF-induction furnace operating at 2200° C. The draw speed was 3.9 meters per second and the tension during drawing was 75 grams. A dual coating of UV-curable acrylate was applied. The drawn fiber had a core of 8.2 μm and outer diameter of 125 μm.

The drawn fiber was measured by the cutback technique. Its loss was 0.42 dB/kilometer at 1.3 μm and 0.35 dB/kilometer at 1.55 μm. In other work, insertion loss was further reduced to characteristic values of the best available commercial fiber.

Example 2

A series of overcladding tubes were prepared from 3000 gm batches of sol (46 wt % $SiO_2$ in water) stabilized by 152 gm of a 25 wt. % aqueous solution of TMAH. Polyethyloxazoline 2.4 gm, ≈50,000 mw, in 20 gm of water, together with 12 gm of glycerin were added and mixed. After aging overnight, the sols were cooled, 24 gms of methyl formate was added, and the two were mixed using a high shear mixer. These were cast into 2½" I.D. molds with 1" O.D. core mandrels.

After standing for approximately 16 hours, the core mandrels were removed and shortly thereafter, the gel bodies were pushed out of the molds on to rollers, while immersed in a tank of water. Each gel cylinder and the two rollers on which it rested were placed in an environment controlled cabinet. Here, while rotating at about 0.2 RPM, the cylinder dried for about seven days at 15° C. and 80% relative humidity. The resulting porous silica bodies were stored for varying periods of time before firing.

Each tube was first prefired by heating to 150° C. over 24 hours. This removed up to 5% of the mass, largely water and organic residues. The dried body was now supported in a firing shroud described earlier. A central "hanging tube" was inserted to a 2" depth into the top of the porous silica tube and the assembly was placed at the bottom of a vertical tube furnace. The shroud and sample were now positioned with its top in the furnace hot zone, and the zone temperature was raised to 1000° C. over a period of 14 hours. The atmosphere in the chamber was controlled by a flow of gas containing 7% $O_2$ and from 0.8 to 1.7% $Cl_2$ in He (total flow = 1400 sccm/min). When the hot zone reached 1000° the sample was raised, using an elevator, through the hot zone in 10 hours. The atmosphere was changed to 7% $O_2$, 93% He, and the sample was lowered to the bottom in the same time period. The temperature of the furnace was now raised to 1475° C., the atmosphere was changed to all He and the sample was consolidated as it rose to the top of the furnace in 5 hours.

Tubes made in this manner, approximately 40 mm O.D. and 18 mm I.D.×50 cm long, were used to overclad 16.5 mm MCVD core-rods according to the teaching of U.S. Pat. No. 4,820,322. The effect of the overclad tube on the fiber loss in the MCVD case was investigated by splitting six MCVD core-rods (each designed for 75 km of fiber after overcladding) between commercial low hydroxyl-content synthetic silica overcladding and sol-gel overclad tubes prepared in accordance with the invention. The first half of each was overclad in the commercial tube—the other half was overclad with a sol-gel tube fabricated as described here. Several fibers were drawn from each section keeping the draw conditions the same. The median transmission loss difference between fibers made with the two overcladdings was 0.003 dB/km at both 1.310 and 1.55 μm. The difference is thought to be statistically insignificant.

Example 3

A tube was made starting with 3500 grams of silica sol (46 wt. % $SiO_2$). To this was added 179 grams of 25% aqueous TMAH and 5.4 grams of polyethylazoline (average molecular weight 50,000) dissolved in 25 grams of water. These were mixed for five minutes in a high shear mixer and then aged overnight at room temperature. Next, the sol was cooled to 10° C., and 26 grams of methyl formate was added while mixing. After forty-five seconds, the sol was transferred to a cylindrical acrylic mold containing an axially centered stainless steel rod, together defining a 63.5×25.4 mm annular cavity. The free space in the mold was evacuated to a few torr to rid the sol of trapped air. The vacuum was removed and the mold was closed. Gelation was substantially complete in fifteen minutes.

The central mandrel was removed after two hours, and the gel body was pushed from the mold onto rollers. The gel cylinder was now dried while rotating at one revolution per hour in 80% relative humidity 20° C. ambient. After ten days, when approximately 97% of the water had been removed, the sample was heated slowly to 120° C. in air and was maintained at that temperature overnight. It was then cooled and placed in a firing shroud as shown in FIG. 4. After the intermediate heating of Table step 11, the assembly was now heated to 1000° C. while once raising and lowering the sample over a ten hour period through a twelve inch hot zone in the furnace. The atmosphere over the sample was maintained at 4% chlorine, 6% oxygen and 90% helium during this firing. Next, the furnace temperature was raised to 1475° C., the atmosphere was changed to all helium, and the sample was passed through the hot zone over a five-hour period.

This tube was first cleaned by etching in 10% aqueous HF for two hours at room temperature. A core rod was then inserted, and the tube and rod were heated in a carbon furnace maintained at a temperature of 1900° C. in He. The core rod consisted of a core region of 3.10 mm diameter. Including the VAD-grown cladding region, it had an OD of 14 mm so that the ratio, D/d=4.5. The index difference between core and cladding in the rod was $\Delta=0.33\%$. The preform was then drawn under familiar commercial conditions (in this instance at a rate of approximately 3m/sec.) Somewhat less than half of the available preform was drawn to yield approximately 22 km of fiber having an outside diameter of 125 $\mu$m. The fiber was coated with an acrylate polymer in accordance with one standard practice. The fiber had an average attenuation of 0.196 dB/km at $\lambda,=1.55$ $\mu$m and of 0.33 dB/km at $\lambda,=1.3$ $\mu$m. Zero chromatic dispersion occurred at 1.3 $\mu$m and cutoff varied between 1.28 and 1.30 $\mu$m.

Example 4

An overcladding tube was prepared under conditions to demonstrate down-doping of gel-derived silica. The tube was prepared by a process similar to that of Example 2:2,750 gms of sol were mixed with 133 gms of (25%) aqueous TMAH. Into this mixture 20 gms of glycerin together with 3.3 gms of Magnifloc 581-C, (a product of American Cyanamid Co., Wayne, N.J.) were added. After overnight equilibration, 28 gms of methyl formate was added and the sol was cast in the mold described in Example 2. The gelled body was removed from the mold and dried as in the previous example. It was then dried and fired according to the following schedule:

Ramp to 120° C. in He 0.5 hr
Hold at 120° C. in He 0.5 hr
Ramp to 1000° C. in 85% He, 10% O$_2$,5% Cl$_2$ in 11 hrs.
Raise sample at 1000° C. to 85% He, 10% O$_2$, 5% Cl$_2$ in 10 hrs.
   Change atmosphere at 1000° C. to 92.2% He, 5.6% Cl$_2$,2.2% SiF$_4$
Lower sample at 1000° C. in 92.2% He, 5.6% Cl$_2$, 2.2% SiF$_4$ in 10 hrs.
Ramp to 1400° C. in 97.6% He, 2.4% SiF$_4$ in 2 hrs.
Raise sample at 1400° C. in 97.6% He,2.4% SiF$_4$ in 5 hrs.

The resulting silica tube had a depressed index: 1.4526 (0.006 units below that of silica). The tube was approximated 50 cm long with an OD of 44 mm and an ID 18 mm.

Example 5

A formulation for the preparation of overcladding tubes included 2500 gram of silica sol (46 wt. % SiO$_2$), 121 grams of 25 wt. % TMAH in water, 3.2 grams of polyethyloxazoline in 26.8 g of water, and 15 grams of glycerin. After aging the sol overnight, 41.2 grams of methyl glycolate was added to the sol. The sol was cast as in Example 2, and gelation occurred in about 35 minutes at room temperature. One such gel body was dried in the identical manner described in Example 2. Upon firing, according to the schedule of Example, 2, a crack-free transparent tube was obtained.

Example 6

A formulation for the preparation of overcladding tubes included 2500 grams of silica sol (46 wt. % SiO$_2$), 125 grams of 25 wt. % aqueous tetraethylammonium hydroxide, 3.2 grams of polyethyloxazoline in 26.8 grams of water, and 15 grams of glycerin. After aging the sol overnight, the sol was cooled in an ice-bath, and 25 grams of methyl formate was added with vigorous stirring (as used upon addition of pH-lowering ester in all of the examples). Gelation occurred in about 20 minutes. A gel body was cast, dried and fired as described in Example 2. Upon firing, a clear crack-free silica tube was obtained.

Example 7

A formulation for the preparation of overcladding tubes included 2500 grams of silica sol (46 wt. % SiO$_2$), 121 grams of 25 wt. % aqueous TMAH, 3.2 grams of polyethyloxazoline in 26.8 grams of water, and 15 grams of glycerin. After aging the sol overnight, 47.7 grams of methyl lactate was added to the sol with vigorous stirring. Gelation occurred in about 50 minutes at room temperature. The gel was cast and dried in the manner described in Example 2. Upon firing, a clear crack-free silica tube was obtained.

Example 8

A formulation for the preparation of overcladding tubes included 2500 grams of silica sol (46 wt. % SiO$_2$), 121 grams of 25 wt. % aqueous TMAH solution, 3.2 grams of polyethyloxazoline in 26.8 grams of water, and 15 grams of glycerin. After aging the sol overnight, 54.1 grams of ethyl lactate was added to the sol with vigorous stirring. Gelation occurred in about 60 minutes at room temperature. The gel body was produced by casting and drying in the manner described in Example 3. Upon firing, a clear crack-free silica tube was obtained.

Other Matters

The fundamental problem addressed by the invention is of long standing. There has been an extensive amount of work worldwide directed toward solving the problem—primarily the problem of cracking of sol-gel monoliths in the production of glass bodies produced by sol gel. Relevant writings have attributed the problem to a variety of mechanisms. The inventive findings are based solely on experiment. While such findings are consistent with certain of the mechanistic explanations, they do not unambiguously support any.

A prevalent mechanistic explanation entails pore size during gel drying. It is thought that cracking has its origin in capillary strain—in tension of free water surface presented (more generally of surface tension of the suspension medium used) upon partial removal of water from the pores. Such strain increases with smaller pore size—to aggravate the effect for small particle size (whether included in narrow or broad distribution). It is interesting to note that experimental results are consistent with this mechanistic explanation. Polymers of the class indicated—of sufficient wetting capability—are preferably attracted to smaller pores to, in turn, exclude water. Polymer removal, by decomposition to produce gaseous product is effected after water removal. Attainment of minimal free energy at polymer-glass interfaces may be assisted by the known phenomenon of favored precipitation from solution at most-negatively curved surface (e.g., as at particle-to-particle contact points).

The inventive teaching presents a variety of advantages. It is likely that all such advantages will be used in initial commercialization. However, inventive advantages are of greater breadth—a breadth such that commercialization will likely entail uses which are not so restricted. As an example, a significant advantage invokes molding. This permits ready attainment of net shape, or near-net shape at this early stage—may avoid, e.g., machining of the molded body. There are, however, circumstances where the fired gel body—whether molded or not—may not define the shape of the final article (nor of the relevant constituent part of the final article). It is expected that silica tubing, e.g., for use as furnace tubing, may be drawn or extruded from a solid gel body. Economically, this may be the indicated route based on such considerations as: non-criticality of dimensions of the final article (as likely true of furnace tubing); or limited need (insufficient to justify cost of specific mold structures).

We claim:

1. An article at least in part composed of high silica glass produced by a method including the steps of
   fabricating a high-silica body by a method comprising
   gelling a sol, the sol comprising a suspension of colloidal silica particles in a suspension medium, so resulting in a gel,
   drying the gel so as to substantially remove the suspension medium, and
   firing such gel to produce a high-silica glass body, and carrying out any further processing necessary to yield the article,
   characterized in that the said sol, during a substantial part of the gelling, contains additive including a first additive consisting essentially of at least one organic polymer, the polymer being characterized as:
   (1) of amount sufficient to monomolecularly coat from 5% to 50% of the total free surface of the colloidal silica particles,
   (2) of solubility as to result in substantially complete solution in said sol prior to gelation,
   (3) of such nature as to wet the said silica particles,
   (4) of such composition as to thermally decompose primarily to gaseous decomposition product so that the high silica glass body is substantially free of the polymer as well as of decomposition product constituting a meaningful contaminant deleteriously affecting performance of the article.

2. An article of claim 1 in which the suspension medium is aqueous, and in which gelation entails reducing the pH of the sol.

3. An article of claim 2 in which the said particles have a maximum surface area of 100 square meters per gram, in which the amount of silica in the sol is at least 30 weight percent as based on the sol, and in which the pH of the sol prior to gelation at some time attains a value of at least 9.5.

4. An article of claim 3 in which the attained value of at least 9.5 prior to gelation is assured by inclusion of a pH-increasing ingredient in the sol, and in which reducing pH is at least in part due to addition of a pH-decreasing ingredient to the sol.

5. An article of claim 4 in which the sol is introduced into a mold within which the gelation takes place, in which the pH-decreasing ingredient is added to the sol prior to introduction of the sol into the mold, and in which the pH-decreasing ingredient consists essentially of an ester whereby the rate of gelation is controlled.

6. An article of claim 5 in which the amount of sol as introduced into the mold is sufficient to result in a high silica glass body of a weight of at least 1 kilogram.

7. An article of claim 6 in which the polymer is a polyamide.

8. An article of claim 7 in which the sol includes a second additive which consists essentially of a polyhydric alcohol.

9. An article of claim 8 in which second additive is glycerin.

10. An article of claim 4 in which the pH-increasing ingredient is at least one quaternary ammonium hydroxide.

11. An article of claim 10 in which the pH-increasing ingredient is at least one compound selected from the group consisting of tetramethylammonium hydroxide and tetraethylammonium hydroxide.

12. An article of claim 4 in which the pH-reducing ingredient consists essentially of a water soluble aliphatic ester of an acid selected from the group consisting of formic acid, lactic acid, and glycolic acid.

13. An article of any of claims 1–5,6,7 or 8–12 in which the article is optical fiber, in which the high-silica glass body yields a substantial portion of a fiber, the said method comprising drawing the fiber from a fiber preform comprising the body.

14. An article of any of claims 1–5,6,7, or 8–12, in which the article is optical fiber, in which the high silica glass body constitutes an overcladding tube, and in which the method comprises drawing a fiber from a fiber preform produced by collapsing the tube so as to bring it into intimate contact with an enclosed core rod consisting of a core portion within an inner cladding portion, said core rod being produced by deposition using a process selected from the group consisting of Modified Chemical Vapor Deposition and a soot deposition process selected from the group consisting of Vapor Axial Deposition and Outside Vapor Deposition.

15. An article of any of claims 1–5,6,7, or 8–12 in which the article is optical fiber, in which the high silica glass body constitutes an overcladding tube, and in which the method comprises drawing a fiber from a fiber preform produced by collapsing the tube so as to bring it into intimate contact with an enclosed core rod consisting of a core portion within an inner cladding portion, said core rod being produced by deposition using a process selected from the group consisting of Modified Chemical Vapor Deposition and a soot deposition process selected from the group consisting of Vapor Axial Deposition and Outside Vapor Deposition and in which the tube is fired while enclosing such core rod.

* * * * *